2 Sheets—Sheet 1.

J. M. CHILDS & D. B. SMITH.

Assignors to J. M. CHILDS & Co.

MECHANISM FOR HANGING AND CENTERING GRINDSTONES AND FRAME THEREFOR.

No. 10,813. Reissued Mar. 8, 1887.

WITNESSES:

Pierrepont Barton,

Edwin A. Ridley

INVENTORS:

J. M. Childs

D. B. Smith.

BY

Ridley, Lewis & Porter

ATTORNEYS.

N. PETERS. Photo-Lithographer, Washington, D. C.

2 Sheets—Sheet 2.

J. M. CHILDS & D. B. SMITH.

Assignors to J. M. CHILDS & Co.

MECHANISM FOR HANGING AND CENTERING GRINDSTONES AND FRAME THEREFOR.

No. 10,813. Reissued Mar. 8, 1887.

WITNESSES:
Pierrepont Barton
Edwin H. Ripley

INVENTORS:
J. M. Childs
D. B. Smith.
BY
Ripley, Lewis & Perry
ATTORNEYS.

N. PETERS, Photo-Lithographer, Washington, D. C.

UNITED STATES PATENT OFFICE.

J. MORRIS CHILDS AND DEWANE B. SMITH, OF UTICA, NEW YORK, ASSIGNORS TO J. MORRIS CHILDS & CO., OF SAME PLACE.

MECHANISM FOR HANGING AND CENTERING GRINDSTONES AND FRAMES THEREFOR.

SPECIFICATION forming part of Reissued Letters Patent No. 10,813, dated March 8, 1887.

Original No. 350,972, dated October 19, 1886. Application for reissue filed January 26, 1887. Serial No. 225,597.

*To all whom it may concern:*

Be it known that we, J. MORRIS CHILDS and DEWANE B. SMITH, of Utica, in the county of Oneida and State of New York, have invented certain new and useful Improvements in Mechanism for Hanging and Centering Grindstones and in Frames Therefor; and we do hereby declare that the following is a full, clear, and exact description of the invention, which will enable others skilled in the art to which it appertains to make and use the same, reference being had to the accompanying drawings, and to the letters of reference marked thereon, which form part of this specification.

Our invention relates to mechanism for hanging and centering grindstones and in frames therefor; and it consists in the means hereinafter described, and pointed out in the claims.

Figure 1:
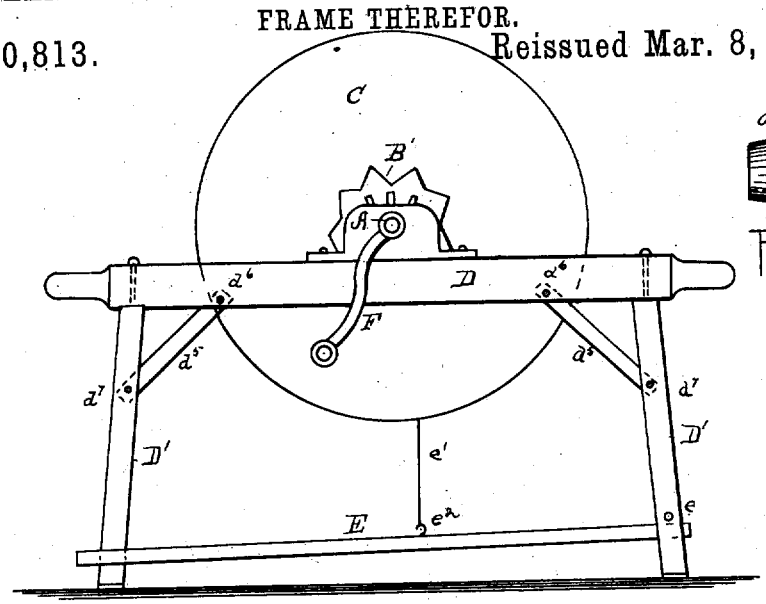
Figure 11:
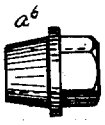
Figure 10:
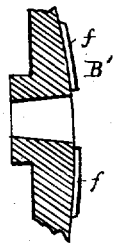
Figure 2:
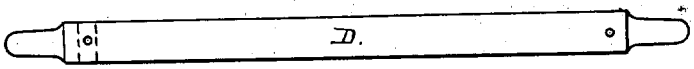
Figure 6:
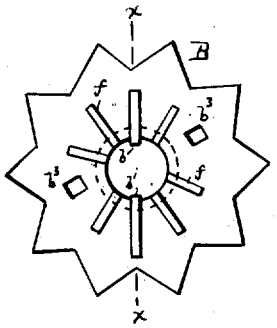
Figure 7:
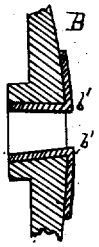
Figure 8:
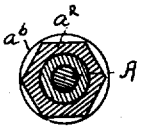
Figure 4:
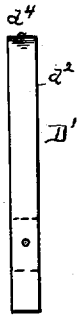
Figure 3:
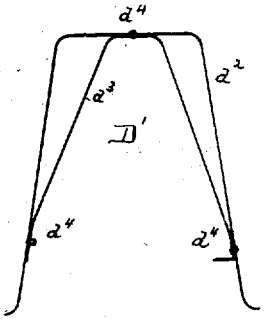
Figure 5:
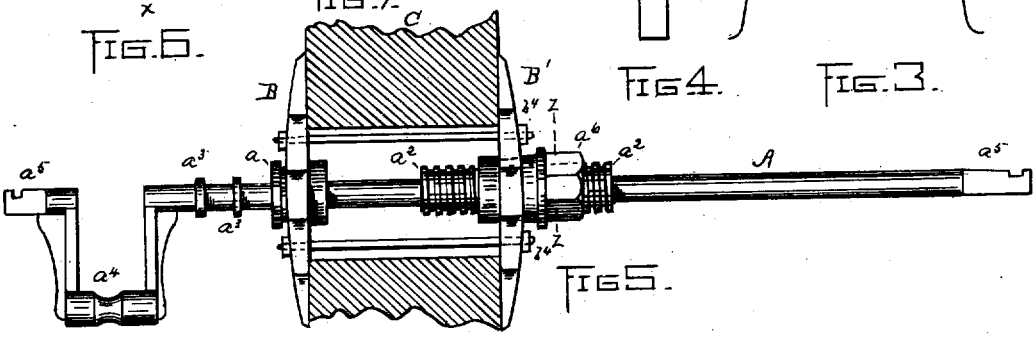
Figure 9:
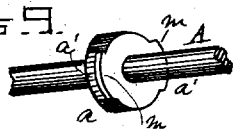
Figure 12:
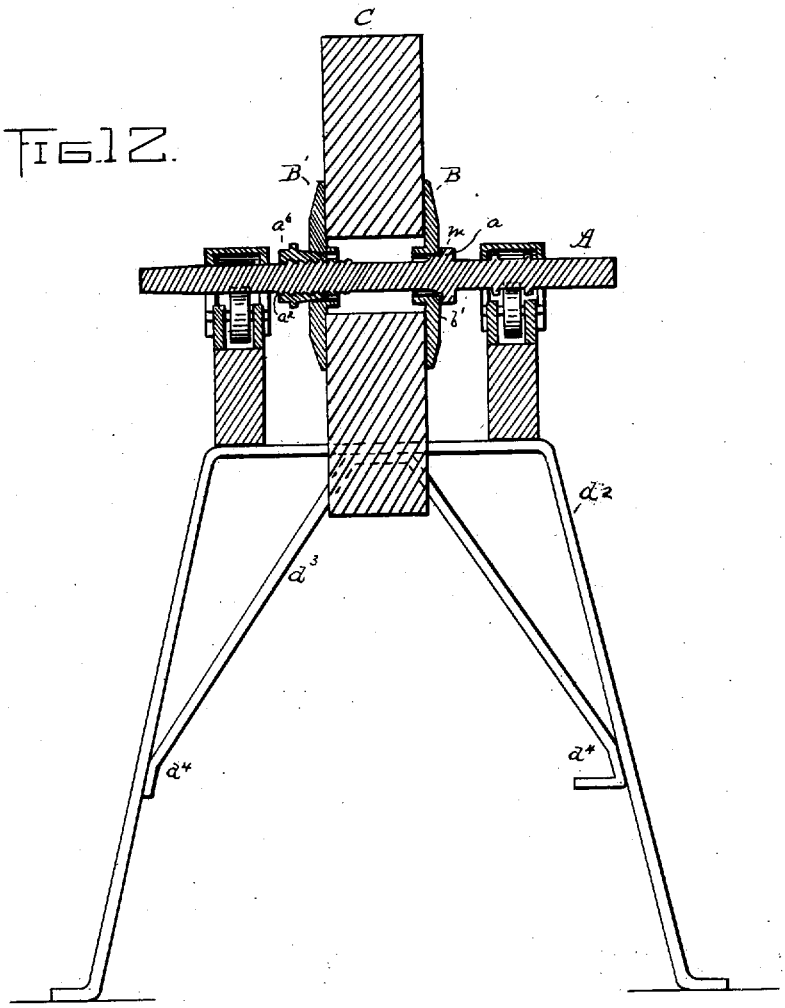

Figure 1 represents a side view of the frame and stone mounted thereon. Fig. 2 is a top view of one of the beams. Fig. 3 is an end view of the truss-leg. Fig. 4 is a side view of the truss-leg. Fig. 5 represents sections of the grindstone, taken through the eye, and edge view of the clamping-disks and a side view of the shaft. Fig. 6 is a side view of one of the centering and clamping disks. Fig. 7 is a partial section of the same disk through line *x x* of Fig. 6. Fig. 8 is a cross-section of the shaft, its screw-thread, and tapering retaining-nut through line *z z*, Fig. 5. Fig. 9 represents a perspective view of a section of the shaft and the fixed shoulder with flanges and grooves thereon. Fig. 10 is a section of a portion of one of the clamping-disks. Fig. 11 is a side view of a tapering retaining-nut. Fig. 12 represents a vertical central section of our grindstone, hanger, and frame.

In the accompanying drawings similar letters of reference refer to corresponding parts throughout the several views.

We rotate the stones by means of a shaft, A, mounted on a frame, the shaft being provided with handle or crank F.

For locking the stone to the shaft on which it is mounted to be rotated we provide a fixed shoulder *a*, Fig. 9. This shoulder is provided with projecting flanges *m m*, Fig. 9, and groove *a'*, Fig. 9, for centering and locking one of the clamping disks to the shaft, as hereinafter more fully explained.

It will here be observed that the fixed shoulder on the shaft may consist of a conical, square, or other shape, (excepting round,) and other means of locking the shaft and disk may be used without departing from the spirit of our invention so long as the fixed shoulder is retained, with suitable means for engaging the disk, which fits and is held thereon.

In the drawings the locking device consists in grooves *a'*, which receive projections *b' b'* in the central opening of the clamping-disk B, which fit into the grooves when the disk is placed on the shaft and driven against projecting flanges *m m*, thereby forming, with the nut hereinafter described, a compact locking device for holding the stone and shaft.

As before mentioned, other means of locking the disk and shaft may be employed so long as a fixed shoulder is retained on the shaft, and one or more of the grooves and projections may also be used. We also preferably provide a raised surface, $a^2$, on the shaft, provided with screw-threads.

We provide stone C, provided with the usual central eye, to which stone we apply on opposite sides, over the eye, clamping-disks B and B', which are held rigidly to the stone by retaining bolts and nuts $b^4$ $b^4$, when the disks are properly centered on the stone. Each of these disks is provided with a central opening for receiving the shaft, disks B being provided with lugs *b' b'*, projecting into the central opening, for the purpose already described, while disk B' is provided with a central opening for receiving tapering nut $a^6$, which fits onto the raised portion $a^2$ of the shaft and serves to center and clamp the stone, with the disks thereon, between the nut and the fixed shoulder, whereby a rigid union is formed between the shaft and stone.

It is obvious that the disk B' may be made to fit the shaft with substantial accuracy, and an ordinary nut be used for clamping the stone between it and the fixed shoulder without departing from the spirit of our invention, although we prefer the tapering nut as the most reliable means for accomplishing this end.

$a^3$ $a^3$ are flanges on the shaft, working on rollers or other supports, for preventing the end-thrust of the shaft.

$a^4$ represents the ordinary crank for attaching a treadle, and $a^5$ $a^5$ represent the bearings for receiving the crank or handle F.

$b^3$ $b^3$ represent bolt-holes in the clamping-disks.

We provide a truss-frame for mounting this stone, having two horizontal beams, D D, supported at each end on truss-legs D′ D′, which are formed, preferably, of iron, each pair of legs consisting of two pieces (indicated in Fig. 3) forming braces. Each set of legs are riveted at $d^4$, and are formed of two strips of iron, $d^2$ and $d^3$. These legs are braced to the beams by braces $d^5$ $d^5$, one end attached to the beam at $d^6$ $d^6$ and the opposite end to the legs at $d^7$ $d^7$, as shown at Fig. 1, thereby forming a reliable and compact frame easily packed for shipping. We also provide an ordinary treadle, E, one end pivoted to the leg at $e$, and the center of said treadle connected by hook $e^2$ to connecting-rod $e'$, which is attached to crank $a^4$, forming a device in general use.

$f$ $f$ represent strengthening-lugs on the clamping-disks. These may be omitted at the option of the manufacturer.

What we claim as new, and desire to secure by Letters Patent, is—

1. The combination of two disks, each disk having a central perforation, the retaining-bolts for engaging and clamping the disks over the eye of the stone, the shaft with a fixed shoulder and a screw-threaded section, the locking device for engaging one of the disks and rigidly holding the shaft and stone, and the nut for retaining the stone and disk in contact with the fixed shoulder, substantially as described.

2. The combination, with the grindstone and shaft, of the fixed shoulder provided with projecting flange and grooves, a centering and clamping disk with central opening, with lugs projecting into said opening corresponding in number and size to the grooves in the shoulder, a second clamping-disk with central aperture, the two disks held in the eye of the stone by bolts and nuts, and the tapering nut for fitting the central opening in one of the disks and working on the screw-threaded section on the shaft, substantially as described.

3. The combination, with the grindstone having a central eye, of two clamping-disks with central openings rigidly held on opposite sides of the stone over the eye by bolts and nuts, a locking device consisting of a fixed shoulder on the shaft, with grooves and tongues for locking the shaft and disk, the tapering nut, and a screw-threaded section on the shaft, substantially as described, for the purposes stated.

4. The combination of a fixed shoulder on the shaft, two perforated clamping-disks centered and bolted over the eye of the stone, a locking device consisting of a fixed shoulder with grooves for receiving lugs in the opening of one of the disks, a tapering nut for fitting one of the disks, and a screw-threaded section on the shaft for receiving the nut and holding the stone and disk in contact with the fixed shoulder.

5. The combination, in the frame, of two parallel beams supported at each end on truss-legs, each set of legs formed of two bands of iron bent and riveted together, with braces attached to each set and to the parallel beams, substantially as described.

6. The combination of the perforated disks, the bolts and nuts for holding said disks to the stone, the fixed shoulder on the shaft, and means for locking the disk and shaft and holding the same in contact with the fixed shoulder.

In witness whereof we have affixed our signatures in presence of two witnesses.

J. MORRIS CHILDS.
DEWANE B. SMITH.

Witnesses:
EDWIN H. RISLEY,
E. C. RYAN.